(12) United States Patent
Boston

(10) Patent No.: US 6,401,647 B1
(45) Date of Patent: Jun. 11, 2002

(54) FLOATATION BUILDING STRUCTURE

(76) Inventor: Lorenzo E. Boston, P.O. Box 6876, San Francisco, CA (US) 94142

( * ) Notice: Subject to any disclaimer, the term of this patent is extended or adjusted under 35 U.S.C. 154(b) by 0 days.

(21) Appl. No.: 09/759,075

(22) Filed: Jan. 12, 2001

(51) Int. Cl.[7] ............................................. B63B 35/44
(52) U.S. Cl. ..................................................... 114/264
(58) Field of Search ................................ 114/346, 264

(56) References Cited

U.S. PATENT DOCUMENTS

| | | | |
|---|---|---|---|
| 1,088,239 A | * | 2/1914 | Paine .......................... 114/264 |
| 3,521,588 A | | 7/1970 | Atlas |
| 3,581,692 A | * | 6/1971 | Mortellito ..................... 114/0.5 |
| 3,833,954 A | | 9/1974 | Daughenbaugh et al. |
| 4,640,214 A | | 2/1987 | Bruns |
| 4,837,989 A | | 6/1989 | Levy |
| 5,603,189 A | | 2/1997 | Levy |
| 5,605,021 A | * | 2/1997 | Thomann ..................... 52/167.1 |
| D403,041 S | | 12/1998 | Funk |

OTHER PUBLICATIONS

A newspaper article from USA TODAY featuring "Second home– at sea". Dated Dec. 15, 2000.

* cited by examiner

Primary Examiner—Ed Swinehart

(57) ABSTRACT

A floatation building structure for allowing boaters to easily remain on the water and have easily accessible accommodations including overnight lodging. The floatation building structure includes a building structure including a base floor and a dome structure having an outside wall, and also including a plurality of inside walls being arranged to form a plurality of individual cabin-like units, an eating establishment, a recreational facility, an office, theaters, shops, and further including a plurality of outside entrances into the building structure, and also including a plurality of inside entrances.

10 Claims, 2 Drawing Sheets

FLOATATION BUILDING STRUCTURE

BACKGROUND OF THE INVENTION

1. Field of the Invention

The present invention relates to a floating cabin complex and more particularly pertains to a new floatation building structure for allowing boaters to easily remain on the water and have easily accessible accommodations including overnight lodging.

2. Description of the Prior Art

The use of a floating cabin complex is known in the prior art. More specifically, a floating cabin complex heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,640,214; 4,837,989; 5,603,189; 3,833,954; 3,521,588; and U.S. Pat. No. Des. 403,041.

While these devices fulfill their respective, particular objectives and requirements, the aforementioned patents do not disclose a new floatation building structure. The inventive device includes a building structure including a base floor and a dome structure having an outside wall, and also including a plurality of inside walls being arranged to form a plurality of individual cabin-like units, an eating establishment, a recreational facility, an office, theaters, shops, and further including a plurality of outside entrances into the building structure, and also including a plurality of inside entrances.

In these respects, the floatation building structure according to the present invention substantially departs from the conventional concepts and designs of the prior art, and in so doing provides an apparatus primarily developed for the purpose of allowing boaters to easily remain on the water and have easily accessible accommodations including overnight lodging.

SUMMARY OF THE INVENTION

In view of the foregoing disadvantages inherent in the known types of floating cabin complex now present in the prior art, the present invention provides a new floatation building structure construction wherein the same can be utilized for allowing boaters to easily remain on the water and have easily accessible accommodations including overnight lodging.

The general purpose of the present invention, which will be described subsequently in greater detail, is to provide a new floatation building structure which has many of the advantages of the floating cabin complex mentioned heretofore and many novel features that result in a new floatation building structure which is not anticipated, rendered obvious, suggested, or even implied by any of the prior art floating cabin complex, either alone or in any combination thereof.

To attain this, the present invention generally comprises a building structure including a base floor and a dome structure having an outside wall, and also including a plurality of inside walls being arranged to form a plurality of individual cabin-like units, an eating establishment, a recreational facility, an office, theaters, shops, and further including a plurality of outside entrances into the building structure, and also including a plurality of inside entrances.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new floatation building structure which has many of the advantages of the floating cabin complex mentioned heretofore and many novel features that result in a new floatation building structure which is not anticipated, rendered obvious, suggested, or even implied by any of the prior art floating cabin complex, either alone or in any combination thereof.

It is another object of the present invention to provide a new floatation building structure which may be easily and efficiently manufactured and marketed.

It is a further object of the present invention to provide a new floatation building structure which is of a durable and reliable construction.

An even further object of the present invention is to provide a new floatation building structure which is susceptible of a low cost of manufacture with regard to both materials and labor, and which accordingly is then susceptible of low prices of sale to the consuming public, thereby making such floatation building structure economically available to the buying public.

Still yet another object of the present invention is to provide a new floatation building structure which provides in the apparatuses and methods of the prior art some of the advantages thereof, while simultaneously overcoming some of the disadvantages normally associated therewith.

Still another object of the present invention is to provide a new floatation building structure for allowing boaters to easily remain on the water and have easily accessible accommodations including overnight lodging.

Yet another object of the present invention is to provide a new floatation building structure which includes a building structure including a base floor and a dome structure having an outside wall, and also including a plurality of inside walls being arranged to form a plurality of individual cabin-like units, an eating establishment, a recreational facility, an office, theaters, shops, and further including a plurality of outside entrances into the building structure, and also including a plurality of inside entrances.

Still yet another object of the present invention is to provide a new floatation building structure that eliminates overcrowding on beaches.

Even still another object of the present invention is to provide a new floatation building structure that would be much like a floating island.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
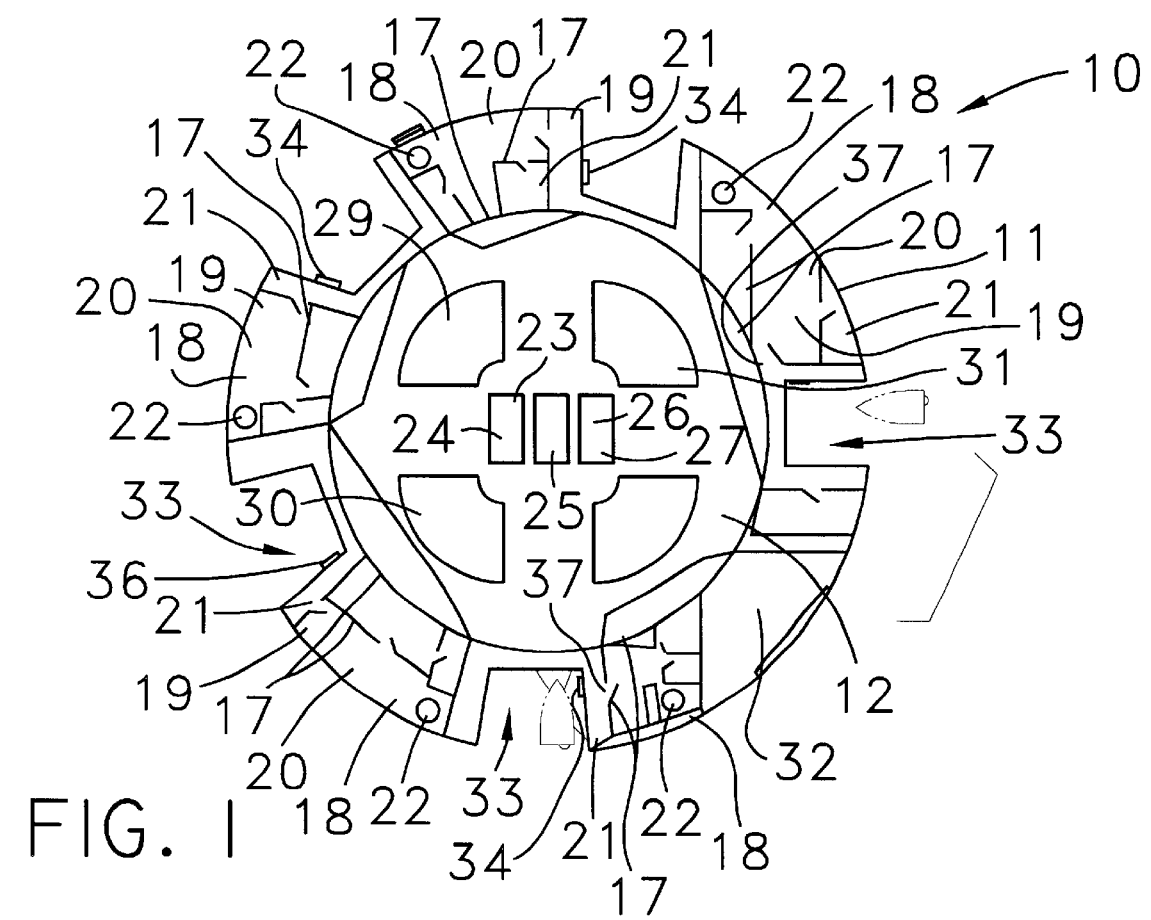
FIG. 1 is a top plan view of a first level of a new floatation building structure according to the present invention.
Figure 2:
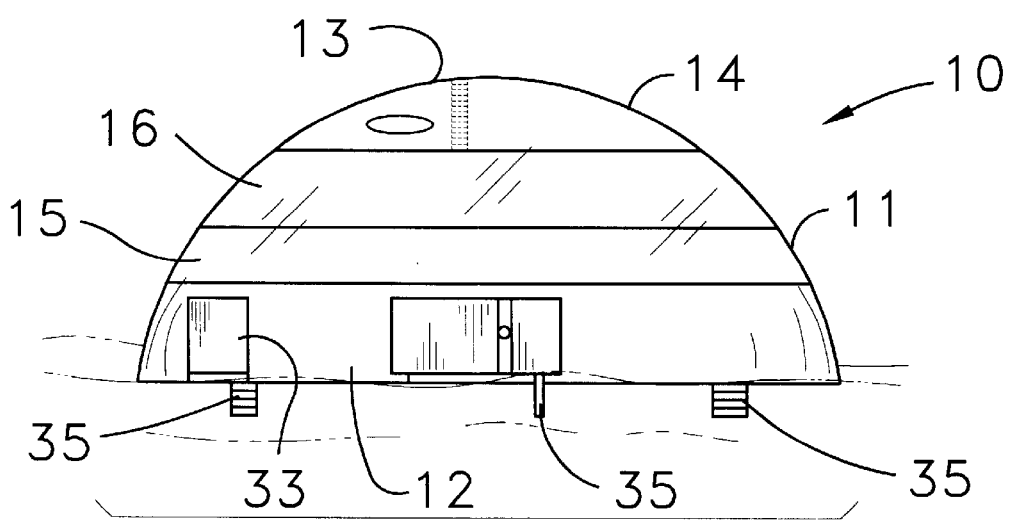
FIG. 2 is a side elevational view of the present invention.
Figure 3:
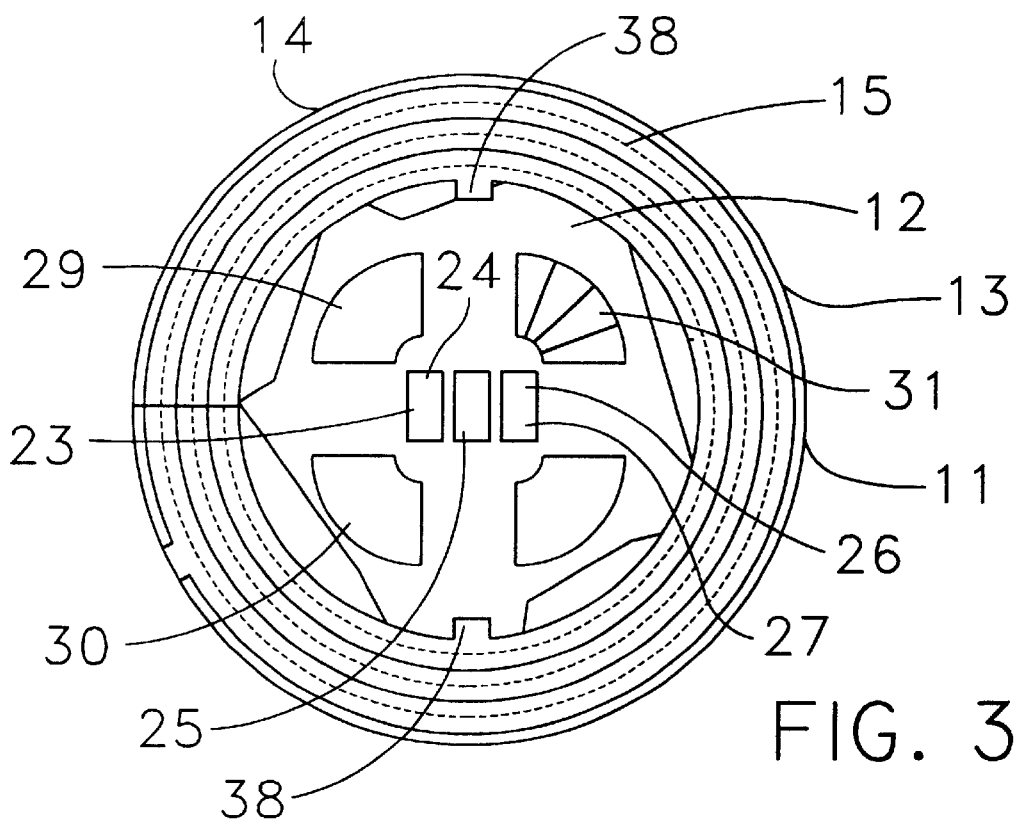
FIG. 3 is a top plan view of a second level of the present invention.
Figure 4:
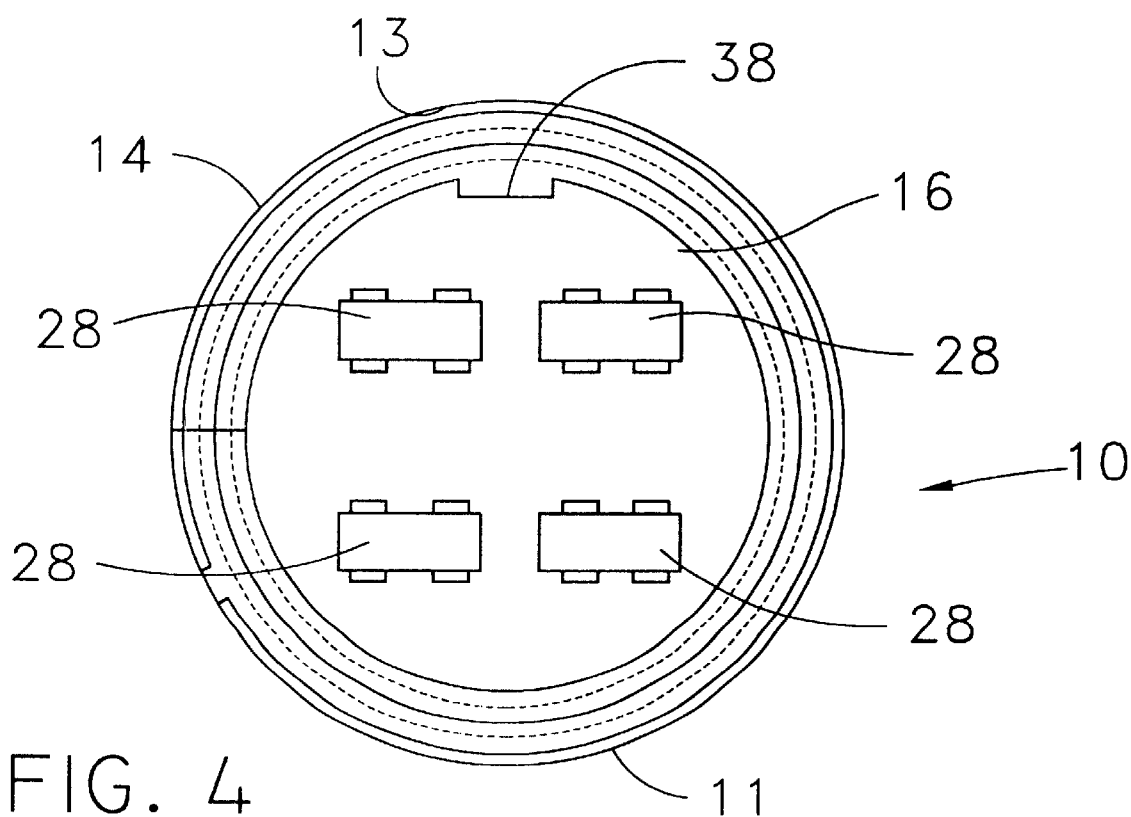
FIG. 4 is a top plan view of a third level of the present invention.

With reference now to the drawings, and in particular to FIGS. 1 through 4 thereof, a new floatation building structure embodying the principles and concepts of the present invention and generally designated by the reference numeral 10 will be described.

As best illustrated in FIGS. 1 through 4, the floatation building structure 10 generally comprises a building structure 11 including a base floor 12 capable of floating upon water and a dome structure 13 having an outside wall 14, and also includes a plurality of inside walls 17 being arranged to form a plurality of individual cabin-like units 18, an eating establishment 29, a recreational facility 23, an office 32, theaters 30, shops 31, and further includes a plurality of outside entrances 34 into the building structure 11, and also includes a plurality of inside entrances 37. The building structure also includes an annular deck 15 which is securely and conventionally attached to an interior of the outside wall 14 of the dome structure 11. The annular deck 15 is a track upon which users are capable of running, walking, or riding a bicycle. The annular deck 15 is conventionally disposed above the base floor 12. The building structure 11 further includes an upper floor 16 which is conventionally disposed above the annular deck 15 and which includes outdoor furniture 28 and which is used for observation purposes. Each of the cabin-like units 18 includes a kitchen 19, bathroom 22, a bedroom 21, and a living room 20. The cabin-like units 18 are arranged along a perimeter of the base floor 12. Each of cabin-like units 18 has respective outdoor and indoor entrances 34–37. The building structure 11 further includes recessed areas 33 being circumferentially-spaced apart and being disposed in a perimeter of the base floor 12 and a lower portion of the outside wall 14 of the dome structure 13. Each of the recessed areas 33 is a boat slip and is adjacent to a respective cabin-like unit 18. Each of the outside entrances 34 includes a ladder 35 conventionally mounted to an exterior of the outside wall 14 of the dome structure 13 and is disposed in a respective recessed area 33, and also includes a door 36 being conventionally attached to a respective cabin-like unit 18 for entry into thereof from a respective boat slip 33. The recreational facility 23 is centrally located upon the base floor 12 and includes a swimming pool 24, a gymnasium, locker rooms 27, sauna 25 and jacuzzi 26. The building structure 11 also includes means of access 38 to the deck 15 and the upper floor 16 from the base floor 12. The means of access 38 includes stairs and escalators.

In use, the user moors one's boat upon one of the boat slips 33 next to the cabin-like unit 18 he/she is occupying. The building structure 11 is all self contained thus providing the user with all the conveniences found on land.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A floatation building structure comprising:

a building structure including a base floor capable of floating upon water and a dome structure having an outside wall, and also including a plurality of inside walls being arranged to form a plurality of individual cabin units, and further including a plurality of outside entrances into said building structure, and also including a plurality of inside entrances;

wherein said building structure further includes recessed areas being circumferentially-spaced apart and being disposed in a perimeter of said base floor and a lower portion of said outside wall of said dome structure, each of said recessed areas being a boat slip and being adjacent to a respective said cabin unit; and wherein each of said outside entrances includes a ladder mounted to an exterior of said outside wall of said dome structure and being disposed in a respective recessed area, and also includes a door being attached to a respective said cabin unit for entry into said respective cabin unit from a respective said boat slip.

2. A floatation building structure as described in claim 1, wherein said building structure also includes an annular deck attached to an interior of said outside wall of said dome structure, said annular deck being a track upon which users are capable of running, walking, or riding a bicycle, said annular deck being disposed above said base floor.

3. A floatation building structure as described in claim 2, wherein said building structure further includes an upper floor which is disposed above said annular deck.

4. A floatation building structure as described in claim 1, wherein each of said cabin units includes a kitchen, bathroom, a bedroom, and a living room, said cabin units being arranged along a perimeter of said base floor, each of cabin units having respective said outdoor and indoor entrances.

5. A floatation building structure comprising:

a building structure including a base floor capable of floating upon water and a dome structure having an outside wall, and also including a plurality of inside walls being arranged to form a plurality of individual cabin units, an eating establishment, a recreational facility, an office, theaters, shops, and further including a plurality of outside entrances into said building structure, and also including a plurality of inside entrances;

wherein said building structure also includes an annular deck which is securely attached to an interior of said outside wall of said dome structure, said annular deck being a track upon which users are capable of running, walking, or riding a bicycle, said annular deck being disposed above said base floor;

wherein said building structure further includes an upper floor which is disposed above said annular deck and which includes outdoor furniture and which is used for observation purposes;

wherein each of said cabin units includes a kitchen, bathroom, a bedroom, and a living room, said cabin units being arranged along a perimeter of said base floor, each of cabin units having respective said outdoor and indoor entrances;

wherein said building structure further includes recessed areas being circumferentially-spaced apart and being disposed in a perimeter of said base floor and a lower portion of said outside wall of said dome structure, each of said recessed areas being a boat slip and being adjacent to a respective said cabin unit; and wherein each of said outside entrances includes a ladder mounted to an exterior of said outside wall of said dome structure and being disposed in a respective recessed area, and also includes a door being attached to a respective said cabin unit for entry into thereof from a respective said boat slip.

6. A floatation building structure as described in claim 5 wherein said recreational facility is centrally located upon said base floor and includes a swimming pool, a gymnasium, locker rooms, sauna and jacuzzi.

7. A floatation building structure as described in claim 5, wherein said building structure also includes means of access to said deck and said upper floor from said base floor, said means of access including stairs and escalators.

8. A floatation building structure as described in claim 1, wherein said recreational facility is centrally located upon said base floor and includes a swimming pool, a gymnasium, locker rooms, sauna and jacuzzi.

9. A floatation building structure as described in claim 1, wherein said building structure also includes means of access to said deck and said upper floor from said base floor, said means of access including stairs and escalators.

10. A floatation building structure comprising:

a building structure including a base floor capable of floating upon water and a dome structure having an outside wall, and also including a plurality of inside walls being arranged to form a plurality of individual cabin units, an eating establishment, a recreational facility, an office, theaters, shops, and further including a plurality of outside entrances into said building structure, and also including a plurality of inside entrances, said building structure also including an annular deck which is securely attached to an interior of said outside wall of said dome structure, said annular deck being a track upon which users are capable of running, walking, or riding a bicycle, said annular deck being disposed above said base floor, said building structure further including an upper floor which is disposed above said annular deck and which includes outdoor furniture and which is used for observation purposes, each of said cabin units including a kitchen, bathroom, a bedroom, and a living room, said cabin units being arranged along a perimeter of said base floor, each of cabin units having respective said outdoor and indoor entrances, said building structure further including recessed areas being circumferentially-spaced apart and being disposed in a perimeter of said base floor and a lower portion of said outside wall of said dome structure, each of said recessed areas being a boat slip and being adjacent to a respective said cabin unit, each of said outside entrances including a ladder mounted to an exterior of said outside wall of said dome structure and being disposed in a respective recessed area, and also including a door being attached to a respective said cabin unit for entry into thereof from a respective said boat slip, said recreational facility being centrally located upon said base floor and including a swimming pool, a gymnasium, locker rooms, sauna and jacuzzi, said building structure also including means of access to said deck and said upper floor from said base floor, said means of access including stairs and escalators.

* * * * *